Figure 7:
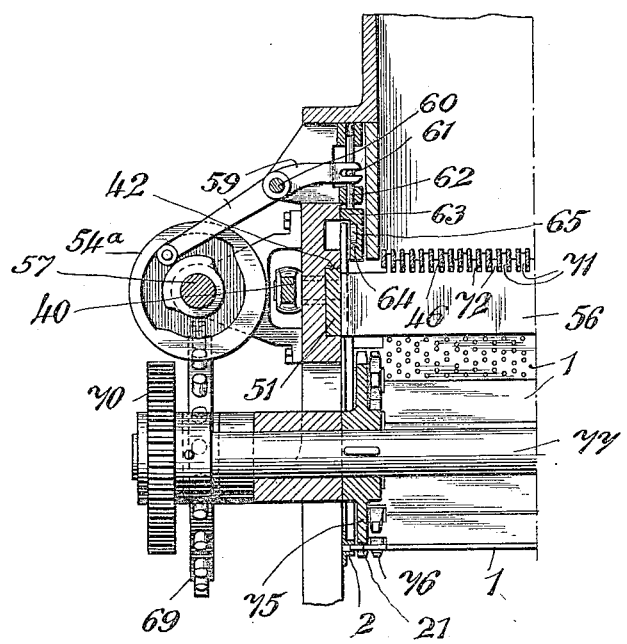

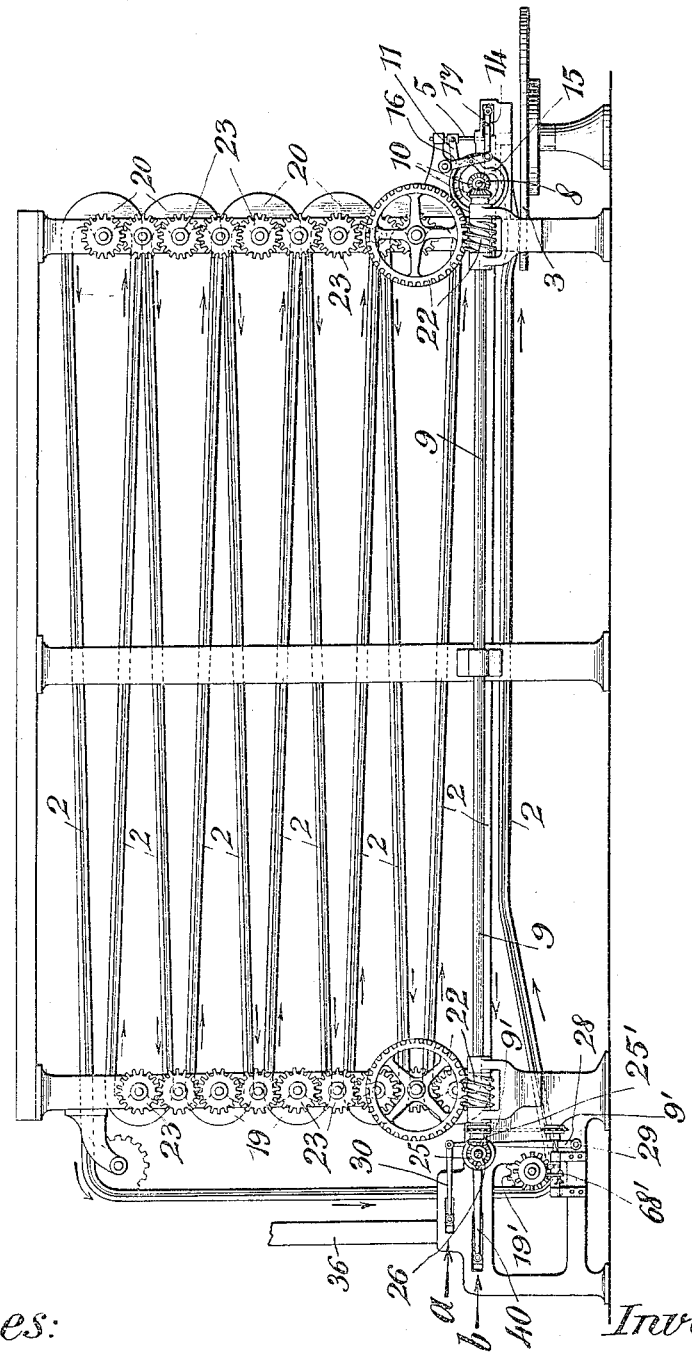

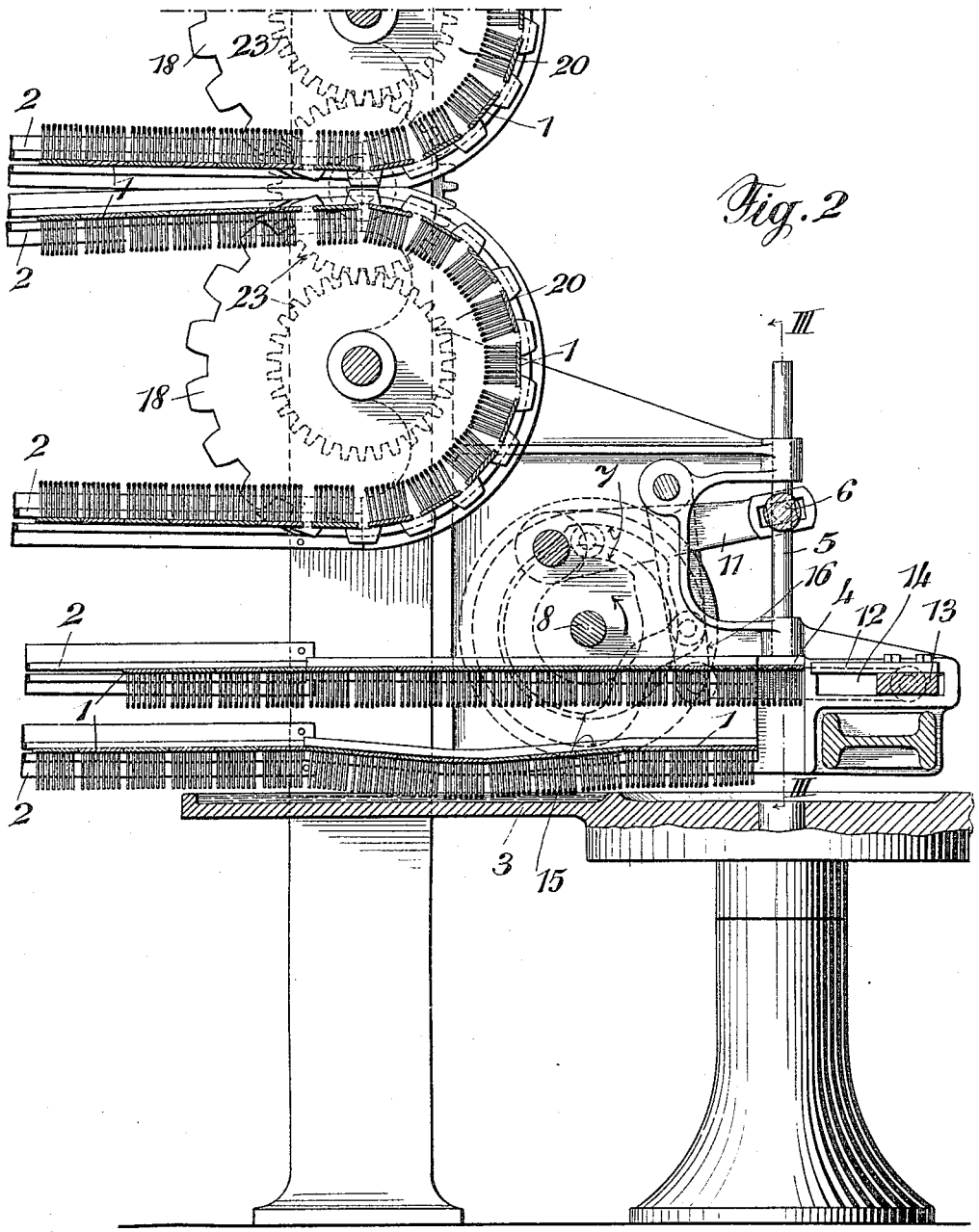

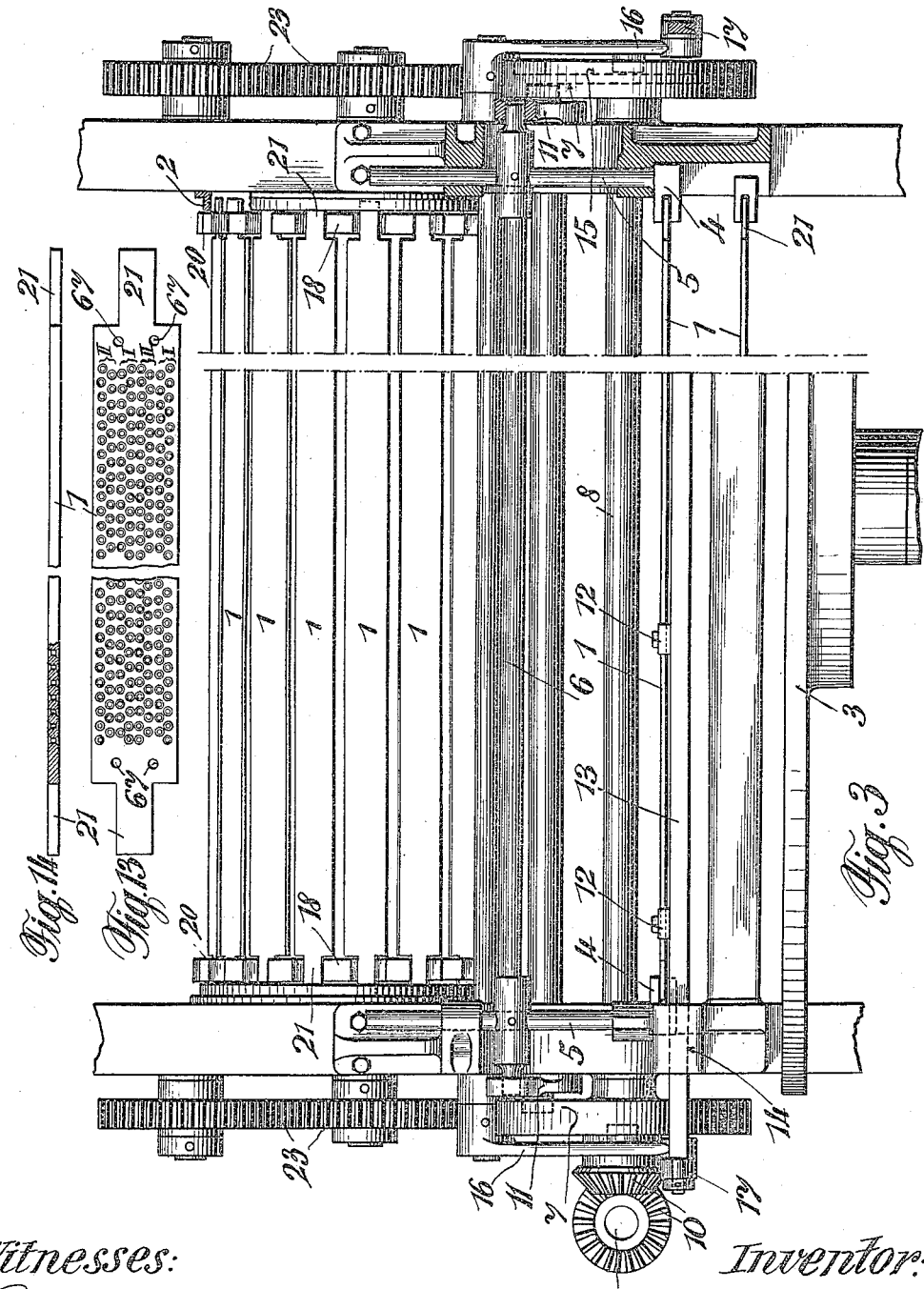

H. A. GSELL.
MATCH MAKING MACHINE.
APPLICATION FILED JUNE 12, 1913.
1,151,680.
Patented Aug. 31, 1915.
7 SHEETS—SHEET 4.
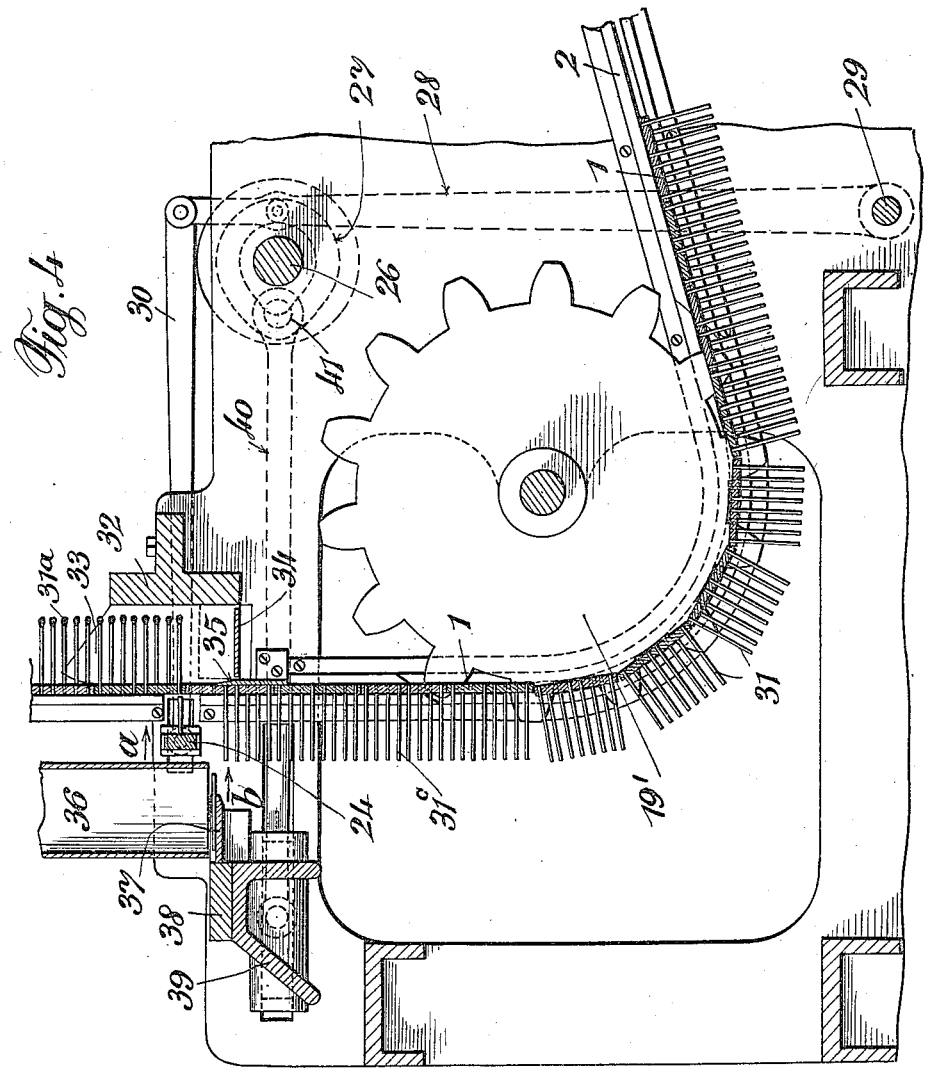

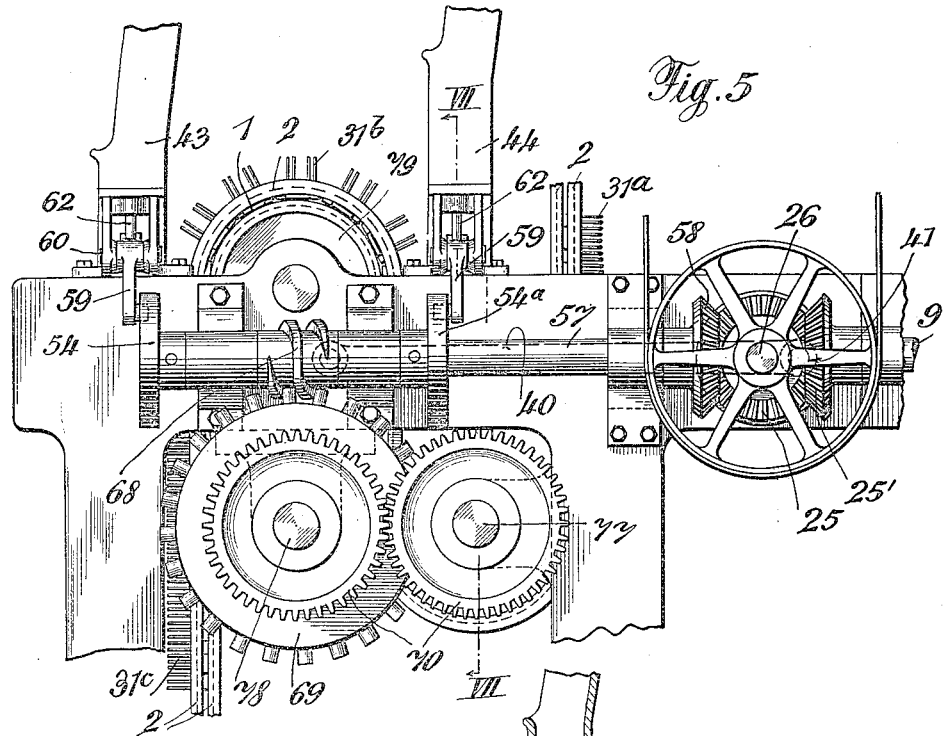
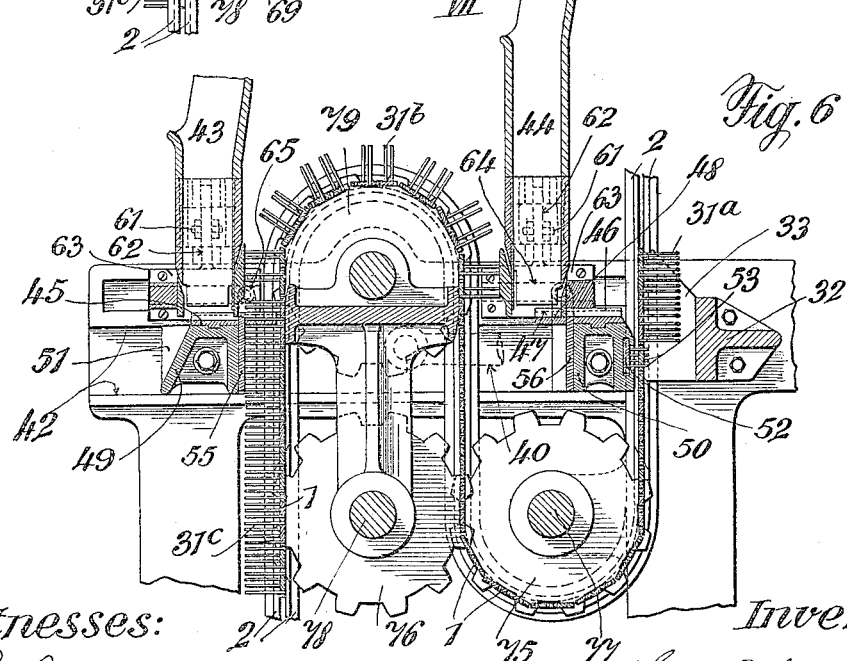

H. A. GSELL.
MATCH MAKING MACHINE.
APPLICATION FILED JUNE 12, 1913.

1,151,680.

Patented Aug. 31, 1915.
7 SHEETS—SHEET 6.

Witnesses:
B. Dommers
E. Leckert

Inventor:
Henry Alfred Gsell.
By
atty.

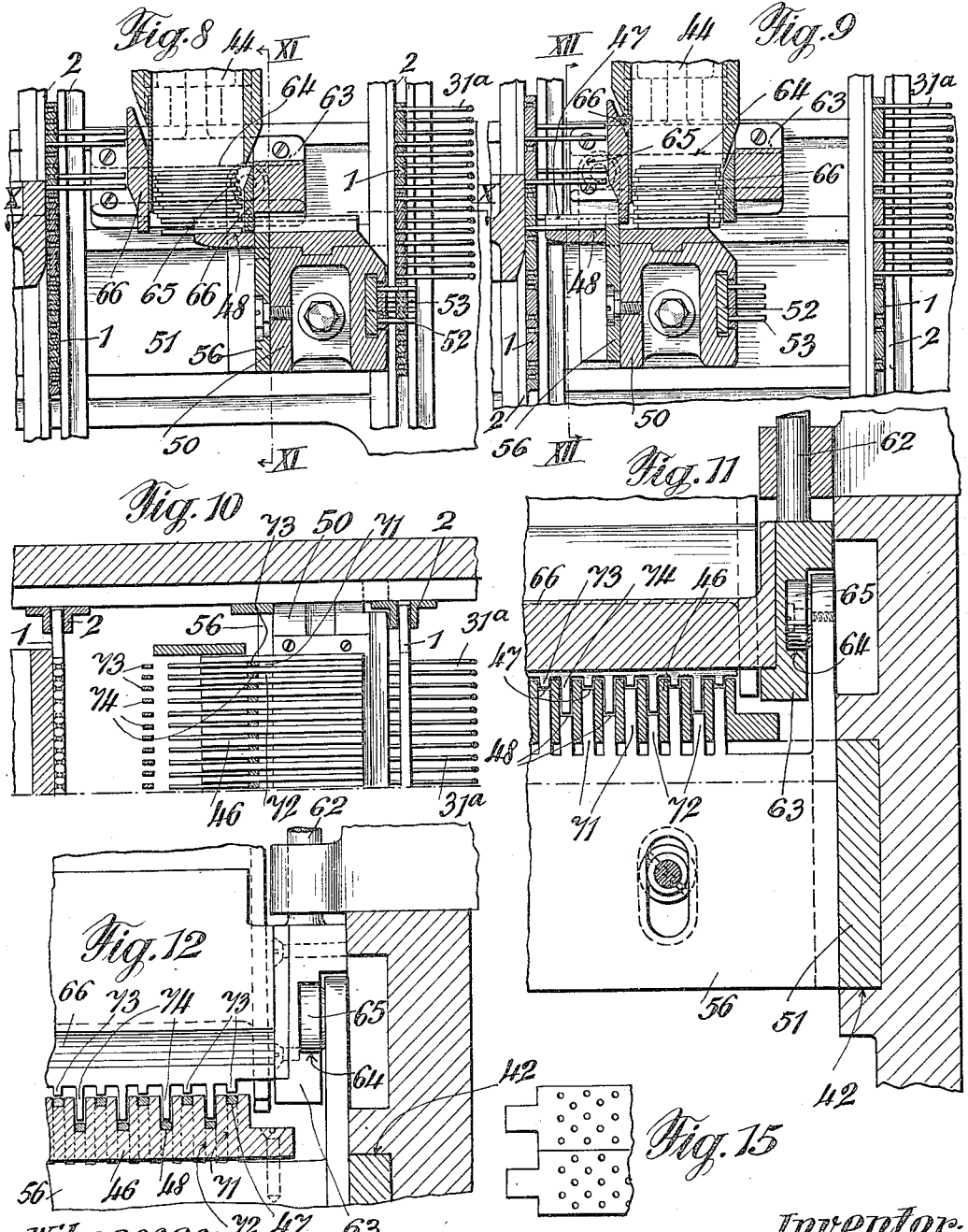

UNITED STATES PATENT OFFICE.

HENRY ALFRED GSELL, OF PARIS, FRANCE.

MATCH-MAKING MACHINE.

1,151,680.

Specification of Letters Patent.

Patented Aug. 31, 1915.

Application filed June 12, 1913. Serial No. 773,311.

*To all whom it may concern:*

Be it known that I, HENRY ALFRED GSELL, a citizen of the Republic of Switzerland, residing at Paris, France, have invented new and useful Improvements in Match-Making Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to match making machines.

Known match making machines provided with match carrier-plates, in which the splints are retained in position by forcing them into perforations, possess various disadvantages. In machines of this type the splints are forced always into the same side of the carrier-plates and ejected from the other side thereof. In consequence of this arrangement the perforations become larger and larger through the continual forcing in of the splints, so that finally they are unable to hold the splints sufficiently secure, the final result being that thicker splints have to be used for the matches. Further in machines of the aforementioned type, it was not convenient to arrange a horizontally turning dipping table outside the machine or the drying track. I am, however, aware that it is known to place continuously rotating dipping or composition rollers at the end of the machine.

The object of this invention is to provide an improved match making machine in which these disadvantages are obviated.

In the present match making machine, the splints are alternately forced into the carrier-plates from one side and then from the other side thereof, and are ejected in a similar manner, once from one side of said plate and the next time from the other side. This is achieved by interrupting the travel of the carrier-plate immediately after dipping by lifting them vertically from a lower track into a higher track and by moving these plates in the higher track, so that the previously forward edge becomes the rear edge. In this manner the life of the carrier-plates is lengthened as the wear of the perforations is reduced by one half, since the greatest wear always takes place on the outer side of the perforations as is clearly proved by the matrices of punches. In machines where only one side of the plates is used, the wear must be double as great as in a machine constructed in accordance with this invention.

This invention further renders it possible to interconnect the needle beam used for ejecting the matches from their carriers and the beam for forcing the splints into the same, and to arrange both beams between two branches of a single loop formed by said carriers so that during the forward movement of the beams the splints are inserted in the carriers while during the return movement of the beam the matches are ejected.

As, in the improved machines, the carrier-plates are lifted vertically from the lowest track into the next lowest track and are also moved along the latter track with their heads pointing downward the dipping apparatus may be arranged outside the machine. This arrangement has great advantages as the dipping operation can be much better superintended, controlled, and carried into effect, and in the case of the heading or igniting composition catching fire, the apparatus may be easly removed, or those carriers which are in the greatest danger may be separated from the others, so as to prevent a spreading of the fire. Known feeding and turning apparatus hitherto employed in match making machinery have the drawback that the turning wheels have to be made of very large diameter in order to prevent the matches contained in adjacent carrier plates having perforations arranged in longitudinal rows disposed one close to the other, from coming into contact with each other.

Now the feeding and turning wheels used with the last described arrangement may be reduced in diameter according to the present invention by providing means for producing a free space between the loose plates engaged by said wheels.

In the accompanying drawings, Figure 1 is a side elevation of a machine embodying my invention, Fig. 2 is a similar view of a part of the same, partly in section, drawn on a larger scale, Fig. 3 is an end view of the same partly in section on line III—III of Fig. 2, Fig. 4 is a vertical section, showing one constructional form of the inserting and ejecting mechanism. Fig.

5 is a side elevation, showing a second constructional form of the inserting and ejecting mechanism, Fig. 6 is a vertical section through the same, Fig. 7 is a section on line VII—VII of Fig. 5, Fig. 8 is a vertical section through a part of Fig. 6 drawn to an enlarged scale. Fig. 9 is a similar view showing the aforesaid part in a difworking position. Fig. 10 is a section on line X—X and Fig. 11 on line XI—XI of Fig. 8, Fig. 12 is a section on line XII—XII of Fig. 9. Fig. 13 shows one form of the match carrier which is preferably to be used in connection with the improved machine. Fig. 14 is another view of the same partly in section, Fig. 15 is a view of a detail described more fully hereinafter.

Referring to Fig. 1, the arrow $a$ denotes the place and direction in which the matches are ejected from the match carriers 1, whereas the arrow $b$ denotes the place and direction in which the splints are inserted in said carriers. The match carriers move in the directions indicated by the arrows, whereat they are guided in lateral guides 2. A feeding wheel 19′ for the match carriers 1 is intermittingly turned from a shaft 9 by means of a chain drive 9′ and a feeding screw 68′. The dipping apparatus is arranged outside the machine at 3 and may be of any suitable construction. After dipping the match carriers are moved on to a higher track. For this purpose the carriers 1 are moved in slots provided in movable supports 4. (Figs. 2 and 3). The supports are secured to vertically guided rods 5, which are interconnected by a rod 6. The rods 5 are vertically moved up and down by means of cams 7 mounted on a shaft 8, which is rotated from shaft 9 by means of bevel wheels 10. The shaft 9 is rotated by means of a bevel gear 25, 25′ from the main shaft 26 driven by any suitable means. The cams 7 act on rollers mounted on arms 11 pivoted at one end to the machine frame and at the other end to the rod 6. In this manner the supports 4 are vertically reciprocated between the two lowest tracks. For moving the carriers 1 in this latter track toward the left (Fig. 3) there are arranged pusher rods 12 connected to a cross bar 13 which is horizontally guided in slots 14 provided in the machine frame. The bars 13 are horizontally reciprocated from cams 15 mounted on the shaft 8. The cams 15 act on rollers mounted on arms 16 which are pivoted at one end to the machine frame and connected to the bars 13 by means of links 17. The carrier plates are then conveyed in the usual way by means of feeding and turning wheels 19, 20 which are preferably constructed as shown in Fig. 2. With the old arrangements large feeding and turning wheels are necessary, in order that the heads of the dipped matches carried by the carrier bars shall not come in contact with one another on those wheels on which the match heads point inward and such wheels must have a diameter of at least 1½ meters.

Now according to the present invention the feeding and turning wheels may be made with a very much smaller diameter, of less than ½ meter without contact taking place between the matches contained in the carrier bars. This reduction in diameter is effected by forming spaces between the loose carrier bars whilst they are passing over the feeding and turning wheels 19 and 10 on which the match heads point inward. For this purpose the teeth 18 of the wheels pass between the end pins 21 of the match carriers 1.

The formation of the spaces between the loose carrier bars may be produced by making the teeth 18 of the feeding and turning wheels larger than the spaces between the teeth. The spaces between the loose carrier bars on the feeding and turning wheels prevent effectually any contact taking place between the dipped matches contained in the carrier bars. These spaces may be made smaller or larger at will to suit narrower or wider carrier bars by varying the width of the teeth. Notwithstanding the formation of these free spaces, the carrier plates are moved continuously and in a uniform manner. The turning wheels 19, 20 are rotated from the shaft 9 by means of worm gears 22 and toothed wheels 23. By the described mechanism the matches are conveyed to the ejector at $a$.

In the form of construction of the inserting and ejecting mechanism shown in Fig. 4, a horizontally guided needle beam 24 is employed for ejecting, which beam is reciprocated by means of a cam 27 which is secured to the shaft 26 and acts on a roller mounted on an arm 28 which is pivoted at 29 to the machine frame and connected to the needle beam 24 by a link 30. 31ᵃ denotes in Fig. 4 the matches which are to be ejected. The pressing beam 32 receives the counter pressure, whereas the vertical walls 33 serve to separate the different rows of matches. The ejected matches drop on to a leather belt 34 or the like by which they are laterally removed in a wellknown manner. A protective wall 35 is provided with a beveled or sharp top edge and removes any matches which may not have been ejected and separates the ejected matches from the match carriers.

In the illustrated example an ordinary single row-inserting mechanism is employed. The same however, may be replaced by any other suitable inserting mechanisms provided with a plurality of rows. The splints to be inserted in the carriers are conveyed from the match magazine 36 to an insertion grating 37 arranged beneath the same from which grating they are pushed by a pressing beam 38 into the match carriers 1. The pressing beam is fixed to an insertion beam 39 which is reciprocated horizontally by a crank rod 40 and disk crank 41 on the main shaft 26. 31ᶜ denotes the inserted splints.

The needle beam 24 may be dispensed with altogether, in which case the ejection is effected by the fresh splints which are being inserted.

The inserting and ejecting mechanism shown in Figs. 1 and 4 may be replaced by the one shown in Figs. 5-12. In this form of construction of the mechanism the splints are piled up in magazines 43, 44 and supplied to the grooved plates 45, 46 of the two devices serving for forcing the matches into their carriers, said supply being effected in a known manner by lateral shaking. The rear magazine 44 projects above the front magazine 43, so that both magazines may be conveniently attended to by one person and from one and the same spot. The grooved plates may be provided with grooves of the same depth, or as shown on the drawings and particularly in Figs. 11 and 12, with grooves 47, 48 of different depths. The grooved plates are secured on the inserting beams 49, 50, which are interconnected by a piece 51. The connecting piece 51 is horizontally reciprocated in a guide 42 by a rod 40, which is pivotally connected to the said connecting piece 51 and driven from a crank pin of a wheel 41 on the main shaft 26 as in the first described example (Fig. 1).

In the beam 50 used for inserting the splints in the match carriers, there is arranged a beam 52 for ejecting the matches and which is provided with four rows of needles 53. On each inserting beam there is arranged a vertically movable slide 55, 56 which during the inserting operations serves as back support or abutment for the matches. For this purpose the slides are made comb-shaped and engage from beneath in recesses provided in the grooved plates 45 and 46. Corresponding to the different depths of the grooves 47 and 48, the comb-shaped slides 55, 56 are provided with teeth 71, 72 of alternately different lengths, which teeth in the raised position of the slides form in the grooves the back supports for the splints during the inserting operation. The up and down movement of the slides 55, 56 is produced by cams 54, 54ᵃ on a shaft 57 which is rotated from the main shaft 26 by a bevel wheel 58 meshing with the bevel wheel 25. The cams 54 act on double armed levers 59 which are mounted to turn in bearings 60. By their forked rear ends the levers 59 engage pins 61 on vertically guided rods 62 which carry bars 63 provided with horizontal grooves 64. The slides 55, 56 engage with said grooves 64 by means of rollers 65. The bottom end portions 66 of the magazines 43, 44 which are also made comb-shaped like the slides 55, 56 and have teeth 73, 74 of different lengths are adapted to move vertically in order to prevent more than one splint being carried away in each groove. For this purpose the portions 66 are secured to the bars 63 so that they move vertically up and down together with the slides 55, 56.

The horizontal rows of perforations in the match carriers are preferably arranged alternately staggered and non-staggered as shown in Fig. 13. In contradistinction to the heretofore usually employed uniformly staggered arrangement as shown for instance in Fig. 15 the improved arrangement has the following advantages.

Match carriers having an even number of uniformly staggered rows of perforations cannot be employed when reversing the match carriers as is done according to the present invention, since during this reversing of the match carriers, the arrangement or stagger of the rows would not remain the same as is necessary. In that case it would be necessary to use match carriers having an uneven number of rows of perforations as shown in Fig. 15. This, however, entails the drawback that when employing insertion gratings having grooves of different depths, the rows which have to be simultaneously filled with matches are situated in some cases in different match carriers. This drawback is avoided by employing match carriers with alternately staggered and non-staggered rows as shown in Fig. 13.

In the illustrated example of the machine alternately two rows of perforations, for instance, the rows marked I are filled with splints by the one splint inserting device, and the following two rows, for instance those marked II are filled by the other device. The employment of match carriers with uniformly staggered rows as shown in Fig. 15 would further not permit of the use of guide pins engaging in the holes 67 (Fig. 13), which guide pins should preferably be arranged for the purpose of protecting the comparatively thin ejecting needles.

The match carriers 1 are intermittently moved in the guides 2 by means of feeding wheel 75, 76 on shafts 77, 78. For this purpose there is provided a feeding screw 68 on the shaft 57, which screw meshes with a feed gear wheel 69 mounted to turn on shaft 78. This shaft is intermittently turned in this manner and imparts motion to the shaft 77 by means of toothed wheels 70. 79 designates a turning wheel for the match carriers.

The mode of operation of the inserting and ejecting mechanism shown in Figs. 5 to 12 is as follows: The matches 31ᵃ contained in the carrier plates are moved past the ejecting needle beam 52. By moving the connecting piece 51 toward the right (Fig. 6) the matches are ejected by the needle beam 52. During each stroke four rows of matches are ejected, for instance, during the first stroke the four lower rows I and II (Fig. 13), during the following ejection stroke the four upper rows in the next higher match carrier and so on. Simultaneously with each ejection stroke an insertion stroke is executed by the inserting beam 49. The empty match carriers continue to move firstly past the inserting beam 50. During each return stroke of the connecting piece 51, the inserting beam 50 executes its insertion stroke. After each groove in the plate 46 has been filled with a splint taken from the magazine 44 the ends 66 of the said magazine are moved downward by means of the cam 54$^a$ and bar 63, so that the teeth 73, 74 of said ends engage in the grooves 47, 48, whereby additional splints are prevented from being removed from the magazine and carried away to the left during the movement of the plate 46. During the continued movement of the carrier toward the left, the slide 56 is raised into the position shown in Fig. 9 and forms in the grooves 47, 48 back supports for the splints which are to be inserted, and which are then pushed into the match carriers by the movement of the inserting beam. By this means splints 31$^b$ are forced into the rows of perforations I, whereas the rows II remain unfilled for the time being. Only after the match carriers have moved to the right in Fig. 6 the splints 31$^c$ are pushed into the rows of perforations II, by the front inserting beam 49. The front inserting device works in step with the ejecting beam 52 and alternately with the rear inserting device, but in every other respect it works in the same manner as the latter. The match carriers are then caused to continue their travel as shown in Fig. 1.

I claim:

1. In a match making machine, carrier-plates, means for forcing splints into said plates, means for ejecting matches from the plates, means for feeding the plates, and lateral guides forming trackways for the plates presenting said plates in alternately reversed position to said injecting and ejecting means, the splints inserting and match ejecting means being on the same side of each plate.

2. In a match making machine, a machine frame, carrier plates wholly independent one from the other, lateral guides supported by the machine frame and forming a vertical and a plurality of superimposed inclined trackways for the plates, a horizontally turning dipping table arranged outside the extreme end of the machine, a main driving shaft, means actuated by said shaft for inserting splints into the carrier plates, means actuated by said shaft for ejecting matches from the plates, means actuated by the driving shaft for moving said plates presented in alternately reversed position to said injecting and ejecting means past these last mentioned means and toward the dipping table, means operatively connected to the main driving shaft moving vertically up and down between the lowest and the next lowest tracks formed by said lateral guides to bring the plates immediately after dipping into said next lowest track, where the previously forward edge of each plate becomes the rear edge, a plurality of feeding and turning wheels actuated by the main driving shaft, and horizontally movable pusher means operatively connected to the main driving shaft for moving the plates in the next lowest track toward the lowest turning and feeding wheel.

3. In a match making machine, a machine frame, carrier plates wholly independent one from the other, lateral guides supported by the machine frame and forming a vertical and a plurality of superimposed inclined trackways for the plates, a horizontally turning dipping table arranged outside the extreme end of the machine, a main driving shaft, means actuated by said shaft for inserting splints into the carrier plates, means actuated by said shaft for ejecting matches from the plates, means actuated by the driving shaft for moving said plates presented in alternately reversed position to said injecting and ejecting means, past these last mentioned means and toward the dipping table, an auxiliary shaft driven by said main driving shaft, cam disks fixed to said auxiliary shaft, supports provided with slots adapted to receive a carrier-plate, vertical guide rods secured to said supports, arms pivoted at one end to the machine frame and at the other end to one of said guide rods and acted upon by said cam disks to move said supports up and down between the lowest and the next lowest tracks, cross bars horizontally guided in slots provided in the machine frame, pusher rods connected to said bars, means acted upon by said cam disks to horizontally reciprocate said cross bars and a plurality of feeding and turning wheels actuated by the main driving shaft and conveying the plates from a lower inclined track into the track arranged immediately above said first mentioned track, said cross bars pushing the carrier plates in the lowest track toward the feeding and turning wheel provided at the end of this track.

4. In a match making machine, carrier-plates, lateral guides forming trackways for said plates, a beam for inserting splints into said plates, a needle beam for ejecting matches from the plates, said beams being arranged between two branches of a loop formed by said lateral guides and having opposite directed working strokes, a second beam for inserting splints into said plates operatively connected to the first mentioned beams, the two inserting beams working with opposite branches of a loop forming the continuation of said first mentioned loop, and a magazine for each inserting beam.

5. In a match making machine, carrier-plates having perforations arranged in longitudinal rows therein, the rows of perforations being alternately staggered and non-staggered.

6. In a match making machine, carrier-plates having perforations arranged in longitudinal rows therein, the rows of perforations being alternately staggered and non-staggered, guides forming trackways for said plates, means for interrupting the travel of the plates immediately after dipping to lift said plates from a lower track into a higher track, the plates being moved in this high track in such a manner that the previous forward edge of each plate becomes the rear edge.

7. In a match making machine, carrier plates wholly independent one from the others, guides forming trackways for the plates, means for feeding the plates pushing one another in an intermittent manner over a portion of said trackways, and feeding and turning means for said plates adapted to produce a free space between said loose plates as long as they are engaged by this last mentioned means, which move the plates in a continuous manner over the other portion of said trackways.

8. In a match making machine, carrier plates wholly independent one from the others, guides forming trackways for the plates, means for feeding the plates pushing one another in an intermittent manner over a portion of said trackways and toothed feeding and turning wheels, the teeth of said wheels being larger than the space between said teeth, so that free spaces are formed between the loose plates as long as they are engaged by these wheels, which moves the plates in a continuous manner over the other portion of said trackways.

In testimony that I claim the foregoing as my invention, I have signed my name in presence of two subscribing witnesses.

HENRY ALFRED GSELL.

Witnesses:
O. SIEBENHEAR,
LUCIEN MENNINGER.

Copies of this patent may be obtained for five cents each, by addressing the "Commissioner of Patents, Washington, D. C."